Dec. 29, 1970    W. P. ADDISON, JR    3,551,267

POLYPROPYLENE FABRIC CARPET WRAP

Filed April 4, 1970

INVENTOR
WILLIAM P. ADDISON, JR.
BY Greist, Lockwood, Greenawalt & Dewey
ATT'YS.

United States Patent Office 3,551,267
Patented Dec. 29, 1970

3,551,267
POLYPROPYLENE FABRIC CARPET WRAP
William P. Addison, Jr., Atlanta, Ga., assignor to Allied Products Corporation, Chicago, Ill., a corporation of Illinois
Filed Apr. 6, 1970, Ser. No. 25,796
Int. Cl. D03d *11/00;* D21h *1/08;* B32b *11/06*
U.S. Cl. 161—82          1 Claim

ABSTRACT OF THE DISCLOSURE

Paper, asphalt, and fabric of woven strands of longitudinally oriented polypropylene are laminated by a continuous method in spite of the fact that the softening point of polypropylene is below the laminating temperature of the asphalt. The resulting carpet wrap is more durable, cheaper, stronger and better looking than paper-burlap laminates used heretofore, and yet has much lower bulk density.

---

This invention relates to the manufacture of a new and improved relatively inexpensive, high strength, water impervious wrapping material, which is particularly suitable for use in wrapping articles, such as carpets and the like.

It has been common heretofore to wrap carpets, and the like, in a paper-asphalt burlap laminate. The manufacturing method and the resulting laminate suffered from numerous disadvantages. For example, the burlap raw material, in addition to having the disadvantage of having to be shipped from relatively unreliable and unsanitary overseas sources, is usually available in inexpensive form in a baled condition having loose ends approximately 135 yards apart. In order to utilize this material in the manufacture of the wrapping material in a continuous process, it is considered necessary to first locate the loose ends in the bales and sew the 135 yard length pieces together end-to-end and prewind these materials in order to have a relatively long roll.

Moreover, the use of the burlap material suffered serious disadvantages due to the shortcomings of the burlap material itself. For example, burlap tends to absorb a considerable quantity of water, is susceptible to mold (mildew) and other micro-organism damage and to insect damage and, in spite of its relatively low initial strength, tends to become even weaker due to the ravages of mildew and the like. In the use of the paper-asphalt-burlap laminations heretofore available, the burlap was usually exposed to the elements, and hence readily available for mildew and insect damage.

It has been suggested heretofore that the burlap be replaced by a paper-paper lamination in which paper is bonded to paper by means of a layer of hot melt resin. However, it has proven virtually essential, in order that sufficient strength be achieved, that such laminations include glass fiber reinforcement in the hot-melt bonding layer. One of the disadvantages of this suggested alternative is the fact that relatively expensive fabricating equipment is required in order to manufacture such a glass-fiber reinforced lamination, and presently available commercial equipment used in the manufacture of the burlap lamination will not suffice for its manufacture.

It is an object of this invention to provide a method of manufacturing an inexpensive wrapping material having extremely high strenght, water, insert and mildew resistance, which method is readily adaptable for use in conjunction with presently available burlap laminating equipment.

Another serious shortcoming associated with the use of the burlap lamination wrapping material is the fact that it is relatively bulky, and heavy. It is another object of this invention to provide a method of manufacturing a wrapping material which results in a novel product having relatively high strength, and yet which requires less shipping volume, and less shipping weight per linear unit of material.

Another shortcoming inherent in the heretofore available burlap wrap material is the fact that in addition to being cheap, the burlap wrapping material looks cheap. Burlap, being very coarse, leaves a great deal of exposed asphalt. It is a further object of this invention to provide a high strength wrapping material having improved appearance, which material is not susceptible to mildew or other rotting phenomena, and which retains its physical and chemical characteristics at a substantially constant level for prolonged periods of time.

Another shortcoming of the heretofore used burlap lamination was the fact that, because of its relatively open character, the burlap lamination wrapping material is highly susceptible to being punctured by relatively sharp objects; and, once a sharp point penetrates the burlap wrapping material, the wrapping material itself does not provide resistance to the tearing motion of such a sharp point, e.g., to motion in a direction parallel to the face of the wrapping material, until approximately one-half to three-quarters inch motion has been made by the penetrating object. Needless to say, such a hole and tear in a carpet would be intolerable. It is a further object of this invention to provide a wrapping material which better resists initial penetration by a sharp point, and which resists virtually any tearing motion on the part of a sharp point penetrating therethrough.

It has been suggested that fabric of woven narrow ribbons of longitudinally oriented polypropylene film be used in the manufacture of sand bags, particularly for use in areas subjected to high humidity, micro-organisms and insect deterioration. Though these bags have extremely high strength, it was heretofore reported that heating any such polypropylene containing fabric above its softening temperature, e.g., above about 250° F., causes shrinkage, loss of molecular orientation, and drop in strength. These fabrics, although extremely high in strength, are nonetheless relatively porous, and, in the event of rain, the contents can become quite wet.

I have discovered a novel wrapping material which utilizes the high strength charactertistics of polypropylene fabric, and yet which provides a moisture, micro-organism, and insect barrier as well.

The melting point of polypropylene, regardless of the extent, type or degree of molecular orientation, is approximately 330° F. However, polypropylene, regardless of extent, type and degree of molecular orientation begins to soften at approximately 250° F. and, at temperatures above the softening point, e.g., in the range 260–280° F., substantial loss of the molecular orientation occurs with subsequent loss of strength. A recommended "laminating" temperature for asphalt coating on crepe paper, for example, is between 300 and 350° F. Nonetheless, I have discovered that polypropylene fabric can indeed be laminated to a layer of molten asphalt, providing the essential conditions set forth herein are carefully met, with the result that an extremely high strength stable wrapping material is provided. It is therefore another object of this invention to provide a method of manufacturing laminates of polypropylene fabric, which laminates exhibit high strength characteristics in spite of the relatively high temperatures encountered in the method.

The invention will be described with the aid of the accompanying drawings in which.

Figure 1:
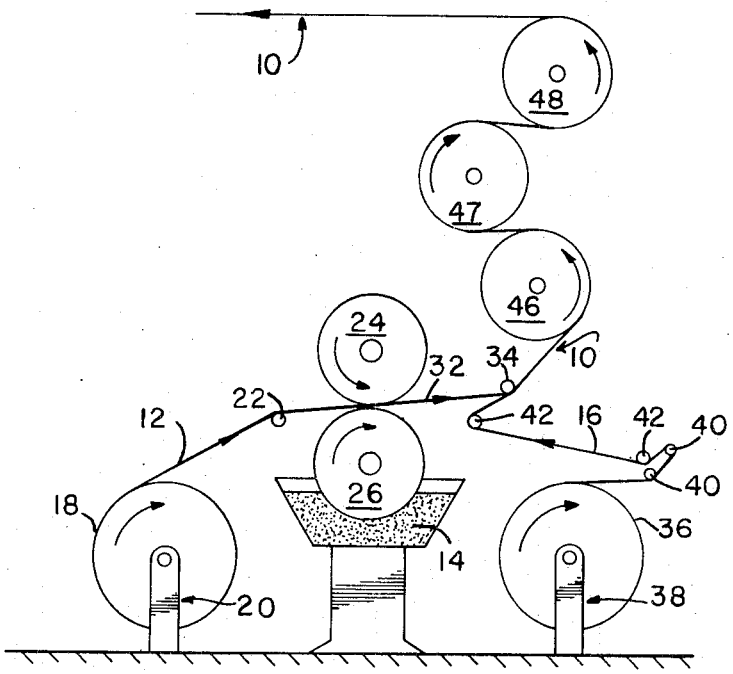
FIG. 1 is a schematic end elevational view illustrating the sequence of steps employed in accordance with this invention in the lamination of woven polypropylene to crepe paper through a molten asphalt layer disposed therebetween.
Figure 3:
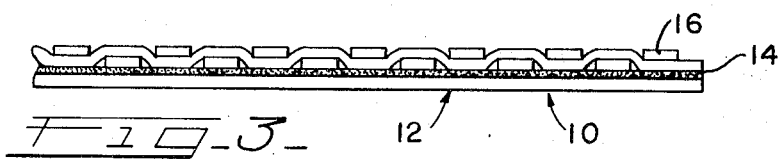
FIG. 3 is a further enlarged fragmentary cross-sectional view taken approximately along the line 3—3 of FIG. 2.
Figure 2:
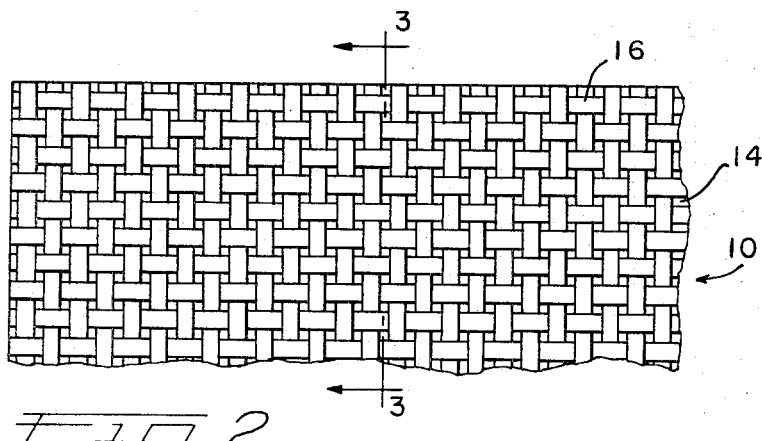
FIG. 2 is an enlarged fragmentary plan view of a swatch of laminate in accordance with this invention.

In accordance with this invention a new and highly useful wrapping material, generally 10, is a lamination of three layers comprising crepe paper 12, asphalt 14 and polypropylene fabric 16. As illustrated in FIG. 1, a roll of crepe paper 18, e.g., 40# basis weight crepe paper (natural kraft color with 12% to 15% stretch) is mounted for unwinding on unwinding means generally indicated at 20. The web 12 of paper, e.g., 92 inches across, is fed around tension take-up roll 22 between presure rolls 24, 26 which are internally heated by steam to provide surface temperatures of approximately 212° F. Lower pressure roll 26 is partially immersed in a pool 28 of molten asphalt. Asphalt adhering to upwardly moving surface 30 of roll 26 is applied continuously to the underside of moving paper web 12. The asphalt-coated paper web 32 is then led around guide roll 34.

Roll 36 of woven polypropylene fabric is mounted on unwinding means schematically indicated at 38. Web 16 of woven polypropylene fabric, having a width substantially equal to that of paper web 12, e.g., 92 inches, is carried around guide rolls 40 past tension-take-up roll 42 and into contact with the asphalt-coated underside of web 32 at guide roll 34. Hence the contact point or line at guide roll 34 is the bonding point or line. Immediately after contacting of the respective web 32, 16, the laminate 10 is fed around a series of water cooled cylinders 46, 47, 48, and, thence to additional cooling cylinders and wind-up apparatus (not shown because conventional). The time and temperature relationships described herein are essential and critical, and substantial departure therefrom results in virtually useless products. However, in accordance with this invention, operating within the temperature-time limitations produces a novel product of relatively low bulk density having a high degree of resistance to moisture, micro-organisms, and dirt, and having high strength and tear resistance.

The asphalt must be applied to the paper at temperatures in excess of 275° F., e.g., at 300° F. to 350° F. When the asphalt is applied at temperatures substantially less than this, the relatively low application or coating rate, e.g., 75# per 3,000 square feet is not readily achievable, and the necessary degree of integration at the paper-asphalt interface is not readily achievable. In accordance with this invention however, the asphalt coating must be cooled to a temperature below the softening point of the polypropylene-containing strands in the fabric, e.g., below 250° F., and above the softening point (ring and ball method) of the asphalt before it is laminated to the polypropylene-containing fabric. Immediately upon contacting of the polypropylene-containing fabric with the asphalt-coated paper, i.e., within less than 2 seconds, the resulting lamination must be subjected to cooling to bring the temperature below the softening point of the asphalt.

In a preferred embodiment, an asphalt having a softening point in the range 175–215° F., more preferably in the range 185–200° F., is heated to a temperature in the range 275–375° F., more preferably in the range 300–350° F., at the point of application to the paper. The resulting coating is cooled to a temperature below 250° F., more preferably below 225° F. but above the softening point of the particular asphalt employed. It is contemplated that, in accordance with this invention, polypropylene-containing copolymers containing more than 50% propylene copolymerized therein, e.g., AT-40 (T.M. Avison) which have softening point other than 250° F., e.g., in the range 230° F. to 290 F., can also be employed, subject to the same method limitations set forth herein.

It is contemplated, also, that the polypropylene-containing fabrics used in accordance with this invention includes any fabric comprising at least 50% by weight polypropylene in conjunction with any natural or "man-made" fibers and/or yarns.

A preferred polypropylene fabric for use in accordance with this invention is a woven fabric or mat of narrow strips of longitudinally oriented polypropylene, which fabric has a minimum of space between adjacent strips. Even a relatively closely woven web of polypropylene fabric has ample pores or passageways between adjacent strips to permit immediate venting of air which would otherwise be trapped between webs 16 and 32 upon contact therebetween. Examples of polypropylene woven fabrics which can be used in accordance with this invention include the following tightly woven polypropylene webs: 8 x 8 count, 2.10 ounces per square yard; 12 x 12 count, 3.2 ounces per square yard; 16 x 9 count, 2.10 ounces per square yard; 16 x 9 count, 2.70 ounces per square yard; etc.

In the woven mats or fabrics set forth immediately above the strands are strips of polypropylene oriented biaxially, and the widths of the strips are selected so that there is minimal space between adjacent strands running in the same direction. Hence, a 9 count represents strands which are relatively wide as compared to the width of strands used in a 16 count. In such embodiments virtually none of the asphalt is directly exposed to the exterior of the wrapping material, and any sharp object almost certainly encounters polypropylene-containing material before encountering the paper layer.

It is essential, in order that the woven fabric have high strength, and that the polypropylene-containing "strands" used in weaving the fabric be oriented in at least the longitudinal direction, it is more preferable that the fabric be manufactured from strips of biaxially oriented polypropylene film. The relatively narrow ribbons or strips of polypropylene which are used in the manufacture of the fabric used in a preferred embodiment of this invention can be made by slitting biaxially oriented polypropylene film, e.g., Hercules "B 500."

Alternatively, in a known manner, polypropylene and polypropylene-containing copolymers can be extruded through a multitude of dies to form narrow ribbons, and the extrudate formed in this manner can be oriented in the longitudinal axis by so-called "differential take-up" in which the extrudate is wound on spools at a faster rate than it is being extruded. As stated hereinbefore, it is essential that the polypropylene be oriented in at least the longitudinal direction of the ribbons used in the fabric.

It is appreciated that a woven material made up of strips may be considered something akin to a "mat" rather than to a "fabric." The term "strand" as used herein is intended to include longitudinally oriented filament and "strips." And as used herein, the terms "fabric" and "mat" are considered equally applicable to the polypropylene-containing ply of the laminate.

Asphalt used in accordance with this invention can be any asphalt material which has a softening point below the softening point of the polypropylene material in the fabric, and which can be applied to paper at temperatures between about 275 and 350° F. An example is a commercial asphalt having the following characteristics:

TABLE I

| Specifications | Specification range | Typical results from production sample |
|---|---|---|
| Softening point, °F.[1] | 185/200 | 189 |
| Penetration (32° F.)[2] | N/L 10 | 11 |
| Penetration (77° F.)[2] | 20–30 | 24 |
| Penetration (115° F.) | Maximum 60 | 46 |
| Ductility | N/L 2.5 cms | 3.5 |
| Solubility (CS₂) | 99.0 | 99.79 |
| Min. flash point | 550° F. (COC) | 595 |
| Ash content | N/M 0.5% | 0.02 |
| Viscosity S.S.F. (350° F.) | 3–6′ (180/360″) | 250″ (4′10″) |

[1] Ring and ball method.
[2] Distance in mm. in 5 seconds, 100 gram ball.

To produce wrapping material for protection of new carpeting, it is preferred that the paper layer, which supports the water barrier-asphalt and which provides the protection against dirt, dust, and the like, be slightly stretchable, e.g., the so-called crepe paper with 10% to 20% stretch. In the product produced in accordance with this invention, many portions of the polypropylene web are bonded directly to the asphalt layer. While I do not want to be bound by any theories, it is my belief, based on repeated observation, that the "working" of the laminate around the cooling cylinder roll provides additional orientation in the machine direction, i.e., in the warp direction. The data of Table I is presented for the purpose of comparing the physical characteristics of a typical burlap asphalt paper lamination to the characteristics of a polypropylene asphalt paper lamination, of this invention, produced on the same equipment. In the manufacturing of each lamination, the equipment used was that illustrated in FIG. 1, herein. The asphalt employed was the material identified in Table I. The temperature of the asphalt in pool 14 was 320° F. The machine was running at 77 yards per minute and asphalt was applied at the rate of 75 pounds of asphalt per 3,000 square feet of paper. Time lapse between application of asphalt to paper, and contact between asphalt coated paper 32, and polypropylene fabric 16 at bonding roller 34 was 0.8 seconds. Nonetheless the temperature of the surface of the asphalt at the bonding roller 34 was 200° F. Time lapse between bonding at roller 34, and initial cooling at roller 46 was about 0.4 second.

TABLE II

| | Polypropylene | Burlap |
| --- | --- | --- |
| Weight in oz./sq. yd. | 6.69 | 11.99 |
| Thread count | 16 x 7 | 10 x 9 |
| Scott strength tests (warp) | 124 lbs. | 112 lbs. |
| Scott strength tests (filling) | 113 lbs. | 82 lbs. |
| Mullen burst test | 225 lbs. | 150 lbs. |
| Gauge (thickness) | 24 mils. | 41 mils. |

When each of the above laminations was rolled into tightly rolled rolls of 250 linear yards each, a particular semi-truck was able to carry 60 rolls (35,000 lbs.) of the paper-burlap laminate, whereas the same truck loaded with the polypropylene laminate carried 80 rolls (24,000 lbs.). The reduced volume and weight provides great savings in shipping costs. Moreover the polypropylene-laminated material had a smooth, attractive appearance and, because of the relatively close weave, left no substantial areas of asphalt exposed through the weave. Moreover, when a sharp needle was driven through the burlap lamination the paper in the paper-burlap lamination could easily tear, i.e., the needle could easily move parallel to the face of the lamination, a distance of approximately ½" before the burlap resisted further tearing motion by the needle. On the other hand, in the novel polypropylene lamination of this invention, a needle, forced through the lamination, can be moved laterally, i.e., parallel to the face of the lamination, only with difficulty, and within approximately 1/16" the polypropylene fabric exerts great resistance to the attempt to tear the lamination. The result is that a hole approximately ½ to ¾" large can be easily torn in the burlap lamination, whereas the lamination of this invention, though puncturable, successfully prevents the initiation of tears. This is believed of considerable importance in the protection of carpeting for shipping.

The method and article can be varied in accordance with the invention within the critical limits set forth herein. However, other non-critical variables can be adjusted over a relatively wide range. For example, the thickness of the individual paper, polypropylene, and asphalt layers can be varied over a wide range depending on the desired economics, strength and other considerations without departing from the invention.

Another advantage of this invention over the burlap laminates, is that the attractive polypropylene fabric face can be printed on, using inks which are known and commercially available.

I claim:
1. A high strength wrapping material which is impervious to dust, moisture, and insects, and which is not adversely affected by micro-organism or insect attack, and which is highly resistant to tearing, the material comprising:
a lamination including layers of paper, and polypropylene fabrics, said layers being bonded together by a continuous coating of asphalt on one face of the paper, said polypropylene fabric including closely woven strips of polypropylene molecularly oriented in at least the longtiudinal direction of the strips.

References Cited

UNITED STATES PATENTS

| | | |
| --- | --- | --- |
| 2,377,979 | 6/1945 | Strable. |
| 2,786,622 | 3/1957 | Ross et al. |
| 2,891,279 | 6/1959 | Neumann. |
| 2,957,793 | 10/1960 | Dickey. |
| 2,975,074 | 3/1961 | Jankens et al. |
| 3,046,155 | 7/1962 | Reinke. |
| 3,055,576 | 9/1962 | Ottinger et al. |
| 3,321,357 | 5/1967 | Kennedy. |
| 3,388,019 | 6/1968 | Thigpen. |
| 3,388,723 | 6/1968 | McNulty. |
| 3,474,625 | 10/1969 | Draper et al. |

ROBERT F. BURNETT, Primary Examiner

R. O. LINKER, JR., Assistant Examiner

U.S. Cl. X.R.

156—282; 161—92, 238, 250, 270; 206—46; 229—87